DATA CHANNEL EQUALIZATION DETECTOR

Filed Dec. 27, 1966 3 Sheets-Sheet 1

INVENTOR.
DONALD A. PERREAULT
BY [signature]
ATTORNEY

DATA CHANNEL EQUALIZATION DETECTOR

Filed Dec. 27, 1966 3 Sheets-Sheet 2

INVENTOR.
DONALD A. PERREAULT
BY Anthony D. Cennamo
ATTORNEY

INVENTOR.
DONALD A. PERREAULT

BY Anthony D. Cennamo

ATTORNEY

United States Patent Office 3,506,918

Patented Apr. 14, 1970

3,506,918

DATA CHANNEL EQUALIZATION DETECTOR

Donald A. Perreault, Pittsford, N.Y., assignor to Xerox Corporation, Rochester, N.Y., a corporation of New York Filed Dec. 27, 1966, Ser. No. 604,992
Int. Cl. H04b *1/00*
U.S. Cl. 325—67 8 Claims

ABSTRACT OF THE DISCLOSURE

A system for effecting channel equalization at a data receiver. Manual means for adjusting the equalization of a data transmission media allow an inexperienced operator to adjust the equalization thereof by simply viewing a meter or other indicating device.

BACKGROUND OF THE INVENTION

In order to maximize the transmission rate of information from one point to another over a limited bandwidth transmission media, it is desirable to approach the maximum limits of the information capability of the medium. Unfortunately, however, as the limit of the information capability is approached, non-linear frequency and/or amplitude distortion increases and thereby increases the difficulty of detecting the transmitted information at the receiving location. In a synchronous digital frequency modulated data transmission system, for example, the principal effect of channels wtih non-linear frequency characteristics is the generation of inter-symbol interference, i.e., the smearing of transmitted symbols into adjacent time intervals allocated to other symbols.

Equalization of the channel characteristics reduces, and ideally eliminates, inter-symbol interference due to the channel. Prior art techniques have included the control of pass-band equalizers by measurement of the pass-band signals. In addition, there are base-band equalizers in the prior art which operate by the automatic measurement of the base-band signals. Known also is the control of pass-band equalizers by the observation of base-band signals. However, prior art measurement requires complex circuitry, while distortion observation requires additional complex equipment not normally part of the system.

Switched communication networks, such as the vast telephone system in the United States and other countries, are increasingly being utilized as a mode of transmission between selected points. In utilizing the swtiched telephone network, for example, prediction of the transmission line characteristics from one point to another is difficult as rarely are the same lines connected for succeeding communications. While sophisticated automatic equalizers are desirable, economic factors demand a low-cost equalizing technique for use with facsimile or other type transmission systems. Therefore, where transmission is to be made over lines or unpredictable characteristics, an equalizing system that can be adjusted by an untrained operator is highly desirable in view of the necessity for a low-cost but accurate technique.

OBJECTS

It is, accordingly, an object of the present invention to provide effective channel equalization at a data receiver.

It is another object of the present invention to provide channel equalization at a data receiver by operation of an untrained operator.

It is another object of the present invention to effectively equalize the characteristics of a communication link by operation of an untrained operator without complicated and expensive equipment.

BRIEF SUMMARY OF THE INVENTION

In accomplishing the above and other desired aspects, applicant has invented novel methods and apparatus for effectively equalizing transmission channel characteristics in a data transmission system. A technique is disclosed for measuring synchronous binary signal quality without employing bit timing to provide a simple means for effecting channel equalization at a data receiver. At the output of a receiving frequency demodulator system comprising a variable equalizer circuit, a demodulator circuit, and a data slicer, is provided a circuit in accordance with the principles of the present invention for monitoring the quality of the signal at the output of the slicer to obtain the desired equalization. By filtering, rectifying, and smoothing the resultant signal from the demodulated and sliced FM signal for application to a visual meter, an untrained person at the receiving location can effectively equalize the characteristics of the communication link without complicated and extensive equipment by merely monitoring the meter reading and adjusting for a null point.

BRIEF DESCRIPTION OF THE DRAWINGS

For a more complete understanding of the invention, as well as other objects and further features, thereof, reference may be had to the following detailed description in conjunction with the drawings wherein.

DETAILED DESCRIPTION OF THE INVENTION

Figure 1:
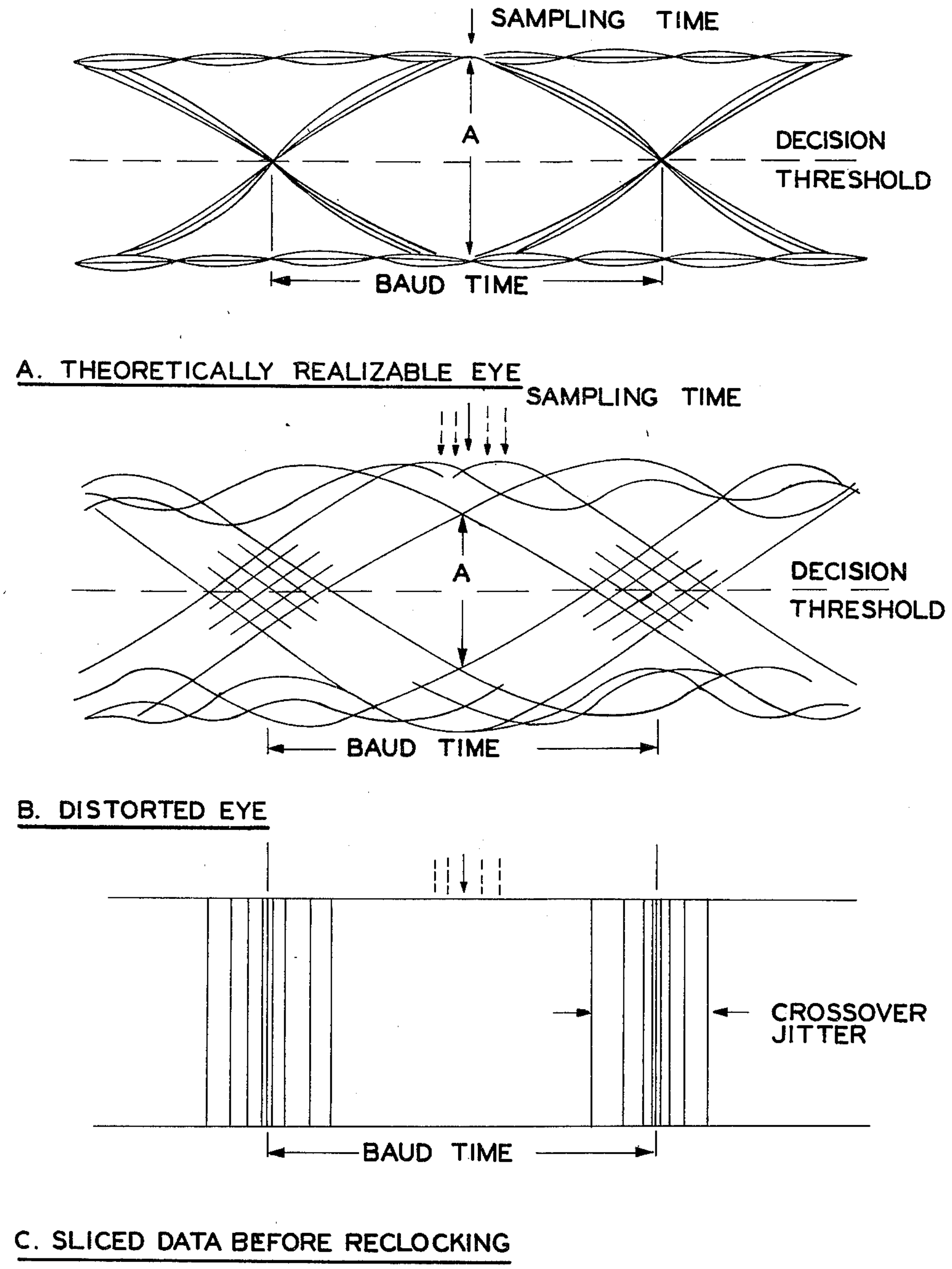
FIGURE 1 are representative drawings of the post detection waveforms at the output of the demodulation system.

Referring now to FIG. 1A, there is shown the familiar eye pattern for a binary waveform typical of the output of systems employing envelope detection. This idealized eye pattern, which is a superposition of all possible binary data transitions, is the waveform seen at the output of the FM demodulator. This pattern can be obtained on an oscilloscope and is commonly used to judge the quality of data waveforms. FIG. 1B illustrates the effect of inter-symbol interference where both the amplitude at the sampling time and the threshold crossovers are disturbed. If the data stream is random, the disturbance appears to be random. Reduction in the aperture, A, of the eye pattern at the sampling time represents loss of margin against noise. Jitter of the crossovers of the decision threshold disturbs the recovered timing used to sample and detect the information in the data waveform. Both effects degrade the error performance of the system.

The subject invention equalizes the channel characteristics and reduces such inter-symbol interference due to the transmission channel. In order to utilize the eye pattern, however, it is essential that bit timing be available to provide synchronization of its sweep across the cathode ray tube. If the transmission channel quality is initially so bad that the data receiver cannot recover bit timing, it is impossible to procede with equalization except on a trial and error basis. Also, it is possible with manually adjusted equalizers to inadvertently further degrade a moderately bad channel and cause the data receiver to lose synchronism. Failure to synchronize initially or inadvertent loss of synchronism makes for an undesirable equalization procedure. It requires an experienced operator or technician to recognize the lack of synchronism and to perform trial and error adjustments which are adapted to the time constants of the timing recovery circuits. The subject invention, as will hereinafter be more fully described, eliminates these difficulties by allowing an inexperienced operator to monitor a meter and adjust the reading for a null position, effectively equalizing the effects of the transmission characteristics to the best capabilities of the equalization and detection circuits.

In systems employing a limited number of equalization characteristics and capable of producing only approximate equalization, it is found that the jitter of the threshold crossovers of the decision threshold, as seen in FIG. 1C, is an adequate measure of the channel quality when random digital data is transmitted. In the absence of jitter, the power density spectrum of the received binary random data after a slicing operation would be the same as for perfectly clocked random digital data, i.e., nonreturn to zero, which is $$f=\frac{T}{4}\left(\frac{\sin \pi f T}{\pi f T}\right)^2 \qquad (1)$$

where T=baud time which equals the bit time for binary data, and $f$=frequency variable.

This spectrum has a zero point at $f=1/T$, i.e., at the frequency corresponding to the baud rate. The power density spectrum of random unclocked binary data is $$f=\frac{1}{4}\left(\frac{a}{a^2+\pi^2 f^2}\right) \qquad (2)$$

where $a$=average number of transitions per unit time. If $a=1/T$, then $$f=\frac{1}{4}\left(\frac{1/T}{1/T^2+\pi^2 f^2}\right)=\frac{1}{4}\left(\frac{T}{1+\pi^2 f^2 T^2}\right) \qquad (3)$$

Figure 2:
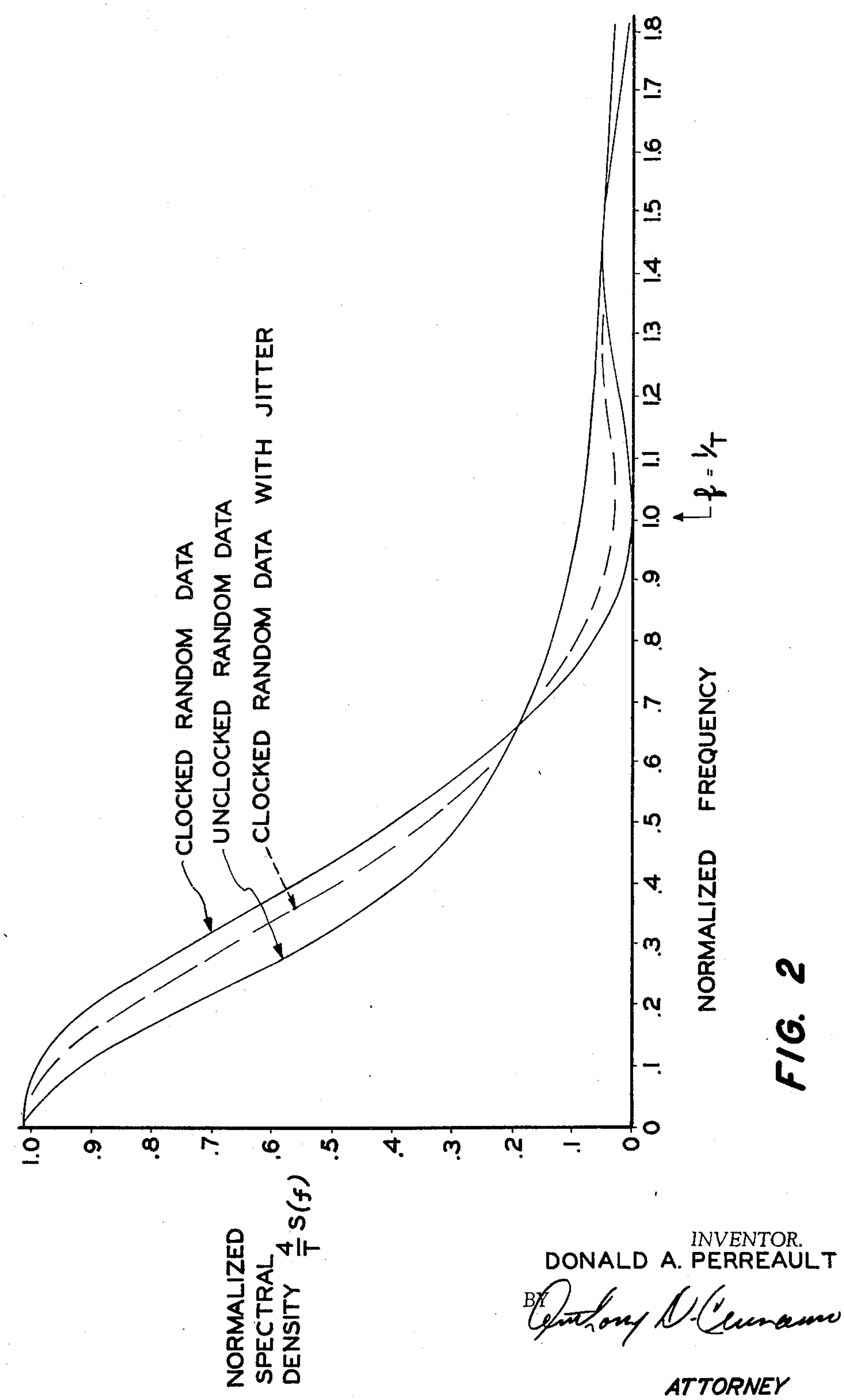
FIGURE 2 shows the spectra of binary data waveforms with and without distortion.

Equation 3 may be considered to approximate a case of extreme jitter in which the normal decision threshold crossover times are completely randomized by the jitter. This spectrum has no zeros. Equations 1 and 3 are plotted in FIGURE 2. Moderately jittered clocked data would fall somewhere between the two extremes, i.e., would have a local minimum at $f=1/T$ but not a true zero. The depth of the known techniques, recover the data timing of the jitter. Therefore, it can be seen that the effect of equalization, which reduces jitter, can be observed by measuring the power spectral density at $f=1/T$.

Figure 3:
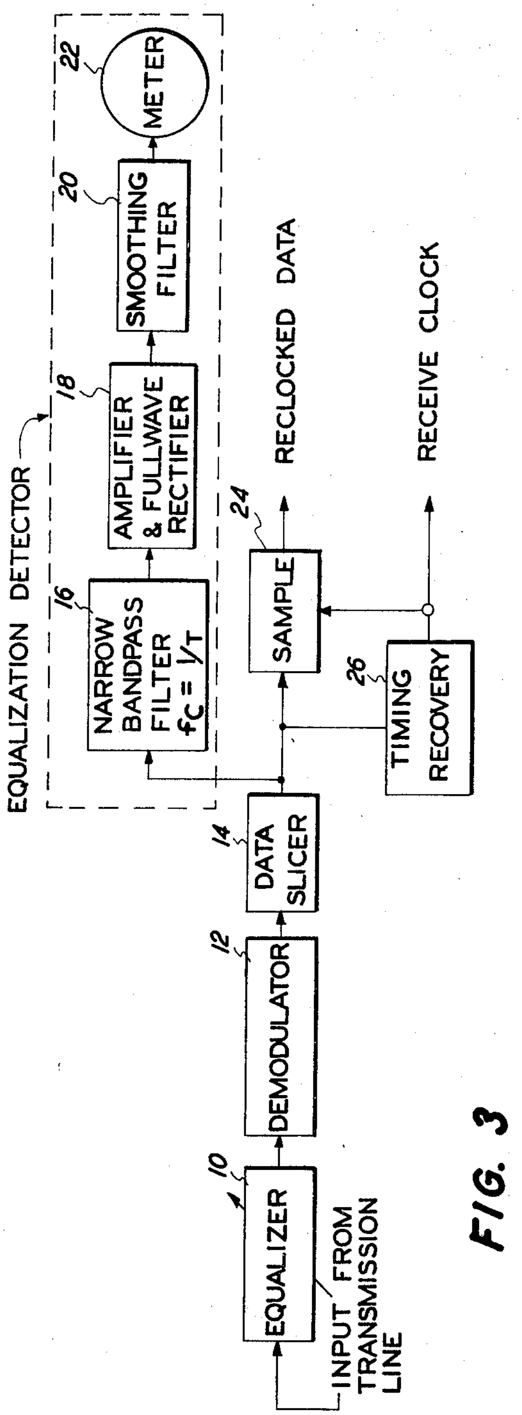
FIGURE 3 is a block diagram of a binary data receiver with an equalization detector.

In FIGURE 3 is shown a block diagram for a binary data receiver utilizing the principles of the present invention in accordance with the above power spectral density discussion. At the output end of the transmission media would be an adjustable equalizer circuit 10, of any known design, to be used by the operator. The equalized signals would then pass to a demodulator 12 to convert the transmitted frequency signals into discrete signal levels as denoted by the eye pattern in FIGURE 1B. The information would then be sliced by data slicer 14 at predetermined decision thresholds. The sliced information would then pass to a timing recovery unit 26 which would, by any of the known techniques, recover the data timing of the transmitted information waveform. The received clock would be used in the rest of the receiving circuit for sampling the information at sample 24 and also for utilization by decoding circuitry to recover the original transmitted information.

Coupled to the output of the data slicer 14 is the equalization detector used to monitor the signal to obtain the maximum equalizaion of the input information. The unreclocked output of the data slicer 14 is applied to the narrow bandpass filter 16, which has a center frequency $f_c=1/T$. The output from the filter 16 is then applied to amplifier and full-wave rectifier 18 to obtain a DC signal which can be smoothed at smoothing filter 20 for application to meter 22 or other indicating device. As minimum jitter or optimum equalization would develop the minimum output from the equalization detector, the equalization procedure is merely to adjust the equalizer 10 to obtain a null or minimum reading on the meter 22 for maximum equalization. Such a procedure affords an untrained operator a simple and reliable technique for equalizing the characteristics of a transmission medium without extensive training or expensive equipment.

Figure 4:
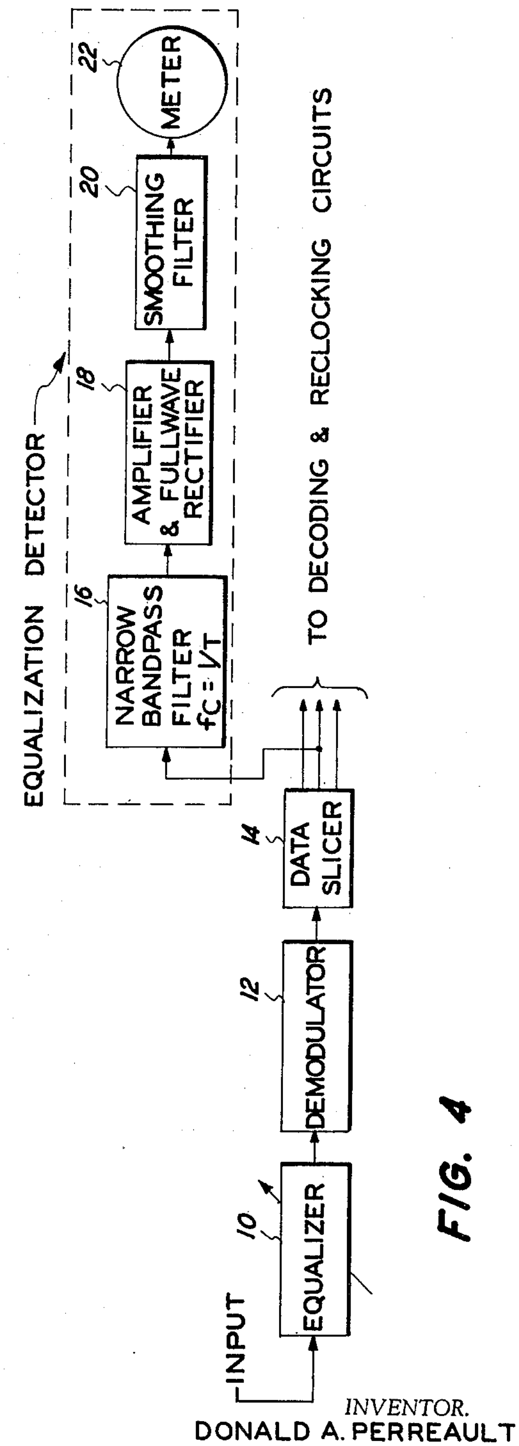
FIGURE 4 is a block diagram of a multilevel data receiver with an equalization detector.

The invention is also capable of being applied to a multilevel system as seen in FIGURE 4, as opposed to the binary system shown in FIGURE 3. Prior to transmission of the data information, the operator would adjust the meter for a null reading, which is based on the center level of such a multilevel system. In this instance, a binary waveform would be transmitted to allow the operator to equalize the system before the transmission of the multilevel data information.

In the foregoing, there has been disclosed methods and apparatus for equalization of the transmission characteristics of a communication media by an untrained operator. While the different embodiments have been described with respect to a frequency modulated information transmission system, the principles of the present invention may be utilized in any data transmission system utilizing envelope detection. While the present invention, therefore, as to its objects and advantages, as described herein, has been set forth in specific embodiments thereof, they are to be understood as illustrative only and not limiting.

What is claimed is:

1. In a data transmission system including a variable equalizer to equalize the characteristics of a transmission media, a demodulator to convert the transmitted signals into discrete levels of data information and a data slicer to determine the transitions in the signals between the discrete levels, an equalization detector comprising:

means for filtering the output from said data slicer to pass a spectrum of signals between predetermined frequency limits, means for amplifying and full-wave rectifying said spectrum of signals to obtain a direct-current signal in direct relation to the quality of the equalization at said variable equalizer, and means for displaying the potential value of said direct-current signal, whereby a minimum reading is indicative of maximum quality equalization of the characteristics of the transmission media.

2. The detector as defined in claim 1 wherein said filtering means is a narrow bandpass filter with a center frequency inversely proportional to the baud time of the data transmission rate.

3. The detector as defined in claim 2 further including:

smoothing filter means coupled to said amplifier and full-wave rectifier means for smoothing the direct current signal therefrom.

4. A system for detecting the quality of the equalization of transmission media characteristics comprising:

means for adjustably equalizing the characteristics of said transmission media, means for converting transmitted information signals into signals indicative of the data transmitted, means coupled to said converting means for transferring a spectrum of signals between predetermined frequency limits, means coupled to said transferring means for generating a direct-current signal in inverse proportion to the quality of equalization at said equalizing means, and means for indicating the value of said direct-current signal.

5. The system as defined in claim 4 wherein said means for converting includes demodulating and slicing circuits, said means for transferring includes a narrow band-pass filter, said means for generating includes amplifying and full-wave rectifying circuits, and said means for indicating includes display means for visual monitoring.

6. The system as defined in claim 5 further including means for smoothing the output signals from said generating means for application to said indicating means.

7. In a data transmission system wherein the characteristics of a transmission media as equalized at a data receiver, the method of detecting the quality of the equalization comprising demodulating the transmitted information to obtain signals of discrete levels indicative of the data in said transmitted information, filtering the discrete level signals between predetermined frequency limits, amplifying and full-wave rectifying said filtered signals, monitoring the value of said amplified and full-wave rectified signals, and adjustably equalizing said transmission media characteristics to obtain a minimum or null value of said signal value.

8. The method as defined in claim 7 further including smoothing said amplified and full-wave rectified signals to obtain a direct-current signal in inverse proportion to the quality of equalization.

References Cited

UNITED STATES PATENTS

| | | | |
|---|---|---|---|
| 1,743,141 | 1/1930 | Ilgenfritz | 333—16 |
| 1,968,164 | 7/1934 | Nyquist | 179—175.3 |
| 2,678,383 | 5/1954 | Frantz | 325—133 XR |
| 2,719,270 | 9/1955 | Ketchledge | 333—16 |
| 3,178,698 | 4/1965 | Graham | 333—16 XR |
| 3,213,196 | 10/1965 | Tuck et al. | 179—175.3 XR |
| 3,287,646 | 11/1966 | Taylor | 325—363 |
| 3,334,301 | 8/1967 | Sarkany et al. | 325—65 XR |
| 3,335,223 | 8/1967 | Johannesson et al. | 325—42 |

FOREIGN PATENTS

| | | |
|---|---|---|
| 865,572 | 4/1961 | Great Britain. |

ROBERT L. GRIFFIN, Primary Examiner

C. R. VON HELLENS, Assistant Examiner

U.S. Cl. X.R.

325—42, 65, 133, 363, 398, 473; 328—162